(12) United States Patent
Issaev et al.

(10) Patent No.: US 7,479,348 B2
(45) Date of Patent: Jan. 20, 2009

(54) NON-AQUEOUS ELECTROCHEMICAL CELLS

(75) Inventors: Nikolai N. Issaev, Woodbridge, CT (US); Michael Pozin, Brookfield, CT (US)

(73) Assignee: The Gillette Company, Boston, MA (US)

( * ) Notice: Subject to any disclaimer, the term of this patent is extended or adjusted under 35 U.S.C. 154(b) by 215 days.

(21) Appl. No.: 11/101,890

(22) Filed: Apr. 8, 2005

(65) Prior Publication Data

US 2006/0228624 A1    Oct. 12, 2006

(51) Int. Cl.
- *H01M 6/04* (2006.01)
- *H01M 4/00* (2006.01)
- *H01M 4/58* (2006.01)
- *H01M 6/16* (2006.01)

(52) U.S. Cl. .................. 429/188; 429/207; 429/221; 429/224; 429/231.95; 429/331; 429/338

(58) Field of Classification Search ............. 429/188, 429/224, 231.95, 331, 207, 221, 338
See application file for complete search history.

(56) References Cited

U.S. PATENT DOCUMENTS

| | | | |
|---|---|---|---|
| 345,124 A | 7/1886 | DeVirloy | 429/207 |
| 2,993,946 A | 7/1961 | Lozier | 136/90 |
| 3,732,124 A | 5/1973 | Cailley | 136/13 |
| 3,761,314 A | 9/1973 | Cailley | 136/13 |
| 3,905,851 A | 9/1975 | Davis Jr. | |
| 4,129,691 A | 12/1978 | Broussely | 429/197 |
| 4,279,972 A | 7/1981 | Moses | 429/50 |
| 4,401,735 A | 8/1983 | Moses et al. | 429/195 |
| 4,499,160 A | 2/1985 | Babai et al. | 429/101 |
| 4,526,846 A | 7/1985 | Kearney et al. | 429/194 |
| 4,529,675 A | 7/1985 | Sugalski | 429/94 |
| 4,555,457 A | 11/1985 | Dhanji | 429/199 |
| 4,755,440 A | 7/1988 | Peled et al. | 429/101 |
| 4,803,137 A | 2/1989 | Miyazaki et al. | 429/194 |
| 4,863,817 A | 9/1989 | Ogino et al. | 429/194 |
| 4,865,932 A | 9/1989 | Masuda et al. | 429/194 |
| 4,925,751 A | 5/1990 | Shackle et al. | 429/191 |
| 4,957,833 A | 9/1990 | Daifuku et al. | 429/197 |
| 4,971,686 A | 11/1990 | Tucholski et al. | 209/548 |
| 5,077,152 A | 12/1991 | Yoshino et al. | 429/209 |
| 5,114,811 A | 5/1992 | Ebel et al. | |

(Continued)

FOREIGN PATENT DOCUMENTS

CA    2336323    6/1999

(Continued)

OTHER PUBLICATIONS

Yang et al., Aluminum Corrosion in Lithium Batteries An Investigation Using the Electrichemical Quartz Crystal Microbalance, Journal of the Electrochemical Society, 147(12) 4399-4407 (2000).*

(Continued)

*Primary Examiner*—Patrick Ryan
*Assistant Examiner*—Thomas H. Parsons
(74) *Attorney, Agent, or Firm*—Fish & Richardson P.C.

(57) ABSTRACT

Electrochemical cells are disclosed. In some embodiments, an electrochemical cell includes a cathode, an anode, and an electrolyte having a first lithium salt and LiBF$_4$.

42 Claims, 6 Drawing Sheets

U.S. PATENT DOCUMENTS

| | | | |
|---|---|---|---|
| 5,176,968 A | 1/1993 | Blasi et al. | 429/194 |
| 5,204,196 A | 4/1993 | Yokomichi et al. | 429/192 |
| 5,225,296 A | 7/1993 | Ohsawa et al. | |
| 5,240,794 A | 8/1993 | Thackeray et al. | 429/224 |
| 5,272,022 A | 12/1993 | Takami et al. | |
| 5,278,005 A | 1/1994 | Yamauchi et al. | 429/194 |
| 5,418,084 A | 5/1995 | Georgopoulos | 429/54 |
| 5,462,820 A | 10/1995 | Tanaka | 429/174 |
| 5,523,073 A | 6/1996 | Sumida et al. | 423/605 |
| 5,541,022 A | 7/1996 | Mizumoto et al. | 429/218 |
| 5,554,462 A | 9/1996 | Flandrois et al. | |
| 5,567,548 A | 10/1996 | Walk et al. | 429/218 |
| 5,569,558 A | 10/1996 | Takeuchi et al. | 429/122 |
| 5,580,683 A | 12/1996 | Takeuchi et al. | 429/194 |
| 5,595,841 A | 1/1997 | Suzuki | 429/217 |
| 5,639,577 A | 6/1997 | Takeuchi et al. | |
| 5,691,081 A | 11/1997 | Krause et al. | |
| 5,750,277 A | 5/1998 | Vu et al. | 429/7 |
| 5,773,734 A | 6/1998 | Young | 75/243 |
| 5,811,205 A | 9/1998 | Andrieu et al. | |
| 5,851,693 A | 12/1998 | Sano et al. | |
| 5,958,625 A | 9/1999 | Rao | 429/241 |
| 6,001,509 A | 12/1999 | Kim et al. | 429/309 |
| 6,017,656 A | 1/2000 | Crespi et al. | |
| 6,025,096 A | 2/2000 | Hope | |
| 6,030,422 A | 2/2000 | Pyszczek | 29/623.1 |
| 6,030,728 A | 2/2000 | Cotte et al. | 429/329 |
| 6,045,950 A | 4/2000 | Chang | 429/306 |
| 6,053,953 A | 4/2000 | Tomiyama et al. | |
| 6,090,506 A | 7/2000 | Inoue et al. | |
| 6,165,644 A | 12/2000 | Nimon et al. | 429/231.95 |
| 6,168,889 B1 | 1/2001 | Dix et al. | |
| 6,190,803 B1 | 2/2001 | Tomiyama et al. | 429/245 |
| 6,218,055 B1 | 4/2001 | Shah et al. | |
| 6,322,928 B1 | 11/2001 | Thackeray et al. | 429/231.2 |
| 6,352,793 B2 | 3/2002 | Kitoh et al. | 429/120 |
| 6,447,957 B1 | 9/2002 | Sakamoto et al. | 429/242 |
| 6,506,516 B1 | 1/2003 | Wietelmann et al. | |
| 6,521,374 B1 | 2/2003 | Nakanishi et al. | 429/178 |
| 6,689,511 B2 | 2/2004 | Yamada et al. | 429/175 |
| 6,780,543 B2 | 8/2004 | Yoshimura et al. | 429/245 |
| 7,285,356 B2 | 10/2007 | Issaev et al. | |
| 2001/0028871 A1 | 10/2001 | Harrison et al. | |
| 2001/0033964 A1 | 10/2001 | Heider et al. | 429/188 |
| 2002/0028389 A1 | 3/2002 | Sonoda et al. | 429/324 |
| 2003/0113622 A1 | 6/2003 | Blasi et al. | 429/199 |
| 2003/0124421 A1 | 7/2003 | Issaev et al. | 429/199 |
| 2003/0143112 A1 | 7/2003 | Suslick et al. | 422/55 |
| 2003/0186110 A1 | 10/2003 | Sloop | |
| 2004/0005267 A1 | 1/2004 | Boryta et al. | |
| 2004/0053138 A1 | 3/2004 | Otterstedt et al. | |
| 2004/0096746 A1 | 5/2004 | Wietelmann et al. | |
| 2005/0019670 A1 | 1/2005 | Amine et al. | |
| 2005/0191545 A1 | 9/2005 | Bowles et al. | |
| 2005/0202320 A1 | 9/2005 | Totir et al. | |
| 2006/0216597 A1 | 9/2006 | Boczer et al. | |

FOREIGN PATENT DOCUMENTS

| | | |
|---|---|---|
| EP | 0 138 056 | 9/1984 |
| EP | 116115 | 5/1986 |
| EP | 0 262 846 | 9/1987 |
| EP | 0 270 264 | 11/1987 |
| EP | 0 441 589 A1 | 8/1991 |
| EP | 0 364 340 B1 | 5/1992 |
| EP | 0391720 | 6/1995 |
| EP | 0 902 492 A1 | 3/1999 |
| EP | 0 852 072 B1 | 9/1999 |
| FR | 1415519 | 9/1965 |
| JP | 63-241867 | 10/1988 |
| JP | 1-227990 | 9/1989 |
| JP | 02-056849 | 2/1990 |
| JP | 02-204976 | 8/1990 |
| JP | HEI 3-84858 | 4/1991 |
| JP | 05-013105 | 1/1993 |
| JP | HEI 5-174873 | 7/1993 |
| JP | 07037572 A | 2/1995 |
| JP | HEI 7-37572 | 2/1995 |
| JP | HEI 8-64237 | 3/1996 |
| JP | 09-050823 | 2/1997 |
| JP | HEI 9-45373 | 2/1997 |
| JP | 09-270272 | 10/1997 |
| JP | HEI 10-50272 | 2/1998 |
| JP | 10-116633 | 5/1998 |
| JP | 10-208725 | 7/1998 |
| JP | HEI 10-189007 | 7/1998 |
| JP | 11-195410 | 7/1999 |
| JP | HEI 11-214016 | 8/1999 |
| JP | P2000-12044 A | 1/2000 |
| JP | 1-281676 | 5/2000 |
| JP | 2001-143753 | 5/2001 |
| JP | 2003-249208 | 9/2003 |
| WO | WO 88/03331 | 5/1988 |
| WO | WO 90/11999 | 10/1990 |
| WO | WO 97/11504 | 3/1997 |
| WO | WO 99/30381 | 6/1999 |
| WO | WO00/55935 | 9/2000 |
| WO | WO 01/80621 A3 | 11/2001 |

OTHER PUBLICATIONS

Morita et al., "Lithium Cycling Efficiency on the Aluminum Substrate in Blended Sulfolane-Ether Systems", J. Electrochem. Soc. :Electrochemical Science and Technology, vol. 134, No. 11, pp. 2665-2669, Nov. 1997.

Matsuda et al., "Organic Electrolyte Solutions for Rechargeable Lithium Batteries", Journal of Power Sources, 20 (1987) 273-278.

"Lithium-bis(oxalate)borate: A Halogen-Free Conducting Salt for Lithium Batteries", Version 2.0/Mar. 2001 (11 pages).

Xu, W. et al., "LiBOB and Its Derivatives: Weakly Coordinating Anions, and the Exceptional Conductivity of Their Nonaqueous Solutions", *Electrochemical and Solid-State Letters*, 4 (1) E1-E4 (2001).

Xu, K. et al., "LiBOB as Salt for Lithium-Ion Batteries: A Possible Solution for High Temperature Operation", *Electrochemical and Solid-State Letters*, 5 (1) A26-A29 (2002).

Xu, K. et al., "Lithium Bis(oxalate)borate Stabilizes Graphite Anode in Propylene Carbonate", *Electrochemical and Solid-State Letters*, 5 (11) A259-A262 (2002).

Falk, S.U., *Alkaline Storage Batteries*, John Wiley & Sons, Inc. (New York, NY), 1969, pp. 1-41.

Wang, X. et al., "Inhibition of Anodic Corrosion of Aluminum Cathode Current Collector on Recharging in Lithium Imide Electrolytes", *Electrochimica Acta* 45 (2000) 2677-2684.

Aluminum 1145-O Available Web Site: http://www.matweb.com/search/SpecificMaterialPrint.asp?bassnum=MA1140 Retrieved from the Internet prior to the filing of the application.

Aluminum 7075-O Available Web Site: http://www.matweb.com/search/SpecificMaterialPrint.asp?bassnum=MA7070 Retrieved from the Internet prior to the filing of the application.

Aluminum 6061-O Available Web Site: http://www.matweb.com/search/SpecificMaterialPrint.asp?bassnum=MA6010 Retrieved from the Internet prior to the filing of the application.

Allegheny Ludlum Type 316L Stainless Steel, UNS S31603 Available Web Site: http://www.matweb.com/search/SpecificMaterialPrint.asp?bassnum=NL316L Retrieved from the Internet prior to the filing of the application.

Aluminum 2024-O Available Web Site: http://www.matweb.com/search/SpecificMaterialPrint.asp?bassnum=MA2240 Retrieved from the Internet prior to the filing of the application.

List of References [online], 93 pages. Retrieved from: the Thomson Derwent World Patent Index. Retrieved prior to the filing of the application.

List of References [online], 103 pages. Retrieved from: the Thomson Derwent World Patent Index. Retrieved prior to the filing of the application.

List of References [online], 4 pages. Retrieved from: the Thomson Derwent World Patent Index. Retrieved prior to the filing of the application.

List of References [online], 31 pages. Retrieved from: the Thomson Derwent World Patent Index. Retrieved prior to the filing of the application.

List of References [online], 10 pages. Retrieved from: the Thomson Derwent World Patent Index. Retrieved prior to the filing of the application.

List of References [online], 5 pages. Retrieved from: the Thomson Derwent World Patent Index. Retrieved prior to the filing of the application.

List of References [online], 61 pages. Retrieved from: the Thomson Derwent World Patent Index. Retrieved prior to the filing of the application.

List of References [online], 2 pages. Retrieved from: the Thomson Derwent World Patent Index. Retrieved prior to the filing of the application.

Linden, D., "Rechargeable Lithium Batteries", Handbook of Batteries, pp. 36.13-36.16, 1995.

Linden, D., Handbook of Batteries, McGraw-Hill, Inc., 1995 "12.1 General Characteristics", pp. 12.1-12.16.

Linden, D., Handbook of Batteries, McGraw-Hill, Inc., 1995 "1.4 Classification of Cells and Batteries", pp. 1-9-1.11; "7.1 General Characteristics and Applications of Primary Batteries", pp. 7.3-7.7; "23.1 General Characteristics and Applications of Secondary Batteries", pp. 23.3-23.12.

Linden, D., Handbook of Batteries and Fuel Cells, McGraw-Hill, Inc., 1984 "11.13 Lithium/Bismuth Oxide Cells", pp. 11-79-11-80.

Product Information, 3M Fluorad Lithium (Bis) Trifluoromethanesulfonimide Battery Electrolyte HQ-115, Sep. 1997.

Machine Translation of JP07037572 (relied upon within the action).

* cited by examiner

Al Electrode. Chronoamperometry (E = 3.6V).
Electrolyte: 0.54M LiTFS, 0.36M LiPF$_6$, 0.24 w/w% LiBF$_4$,
DME:EC:PC 75:10:15 (w/w %).

NON-AQUEOUS ELECTROCHEMICAL CELLS

TECHNICAL FIELD

The invention relates to non-aqueous electrochemical cells.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

SUMMARY

In one aspect, the invention features an electrochemical cell, including a cathode, an anode, and an electrolyte having a first lithium salt and $LiBF_4$.

Embodiments may include one or more of the following features. The first lithium salt includes lithium trifluoromethanesulfonate. The electrolyte further includes a second lithium salt. The second lithium salt is selected from the group consisting of $LiPF_6$ and lithium trifluoromethanesulphonylimide. The electrolyte includes from about 300 ppm to about 40,000 ppm of $LiBF_4$. The first lithium salt includes lithium trifluoromethanesulfonate, and the electrolyte includes from about 300 to about 35,000 ppm of $LiBF_4$. The first lithium salt includes lithium trifluoromethanesulfonate, the electrolyte further includes $LiPF_6$, and the electrolyte includes from about 300 ppm to about 10,000 ppm of $LiBF_4$. The first lithium salt includes lithium trifluoromethanesulfonate, the electrolyte further includes lithium trifluoromethanesulphonylimide, and the electrolyte includes from about 300 ppm to about 40,000 ppm of $LiBF_4$. The cathode includes manganese oxide. The anode includes lithium. The cell further includes an aluminum surface or an aluminum couple. The electrolyte further includes a material selected from the group consisting of ethylene carbonate, propylene carbonate, dimethoxyethane, and butylene carbonate. The electrolyte further includes propylene carbonate and dimethoxyethane. The electrolyte further includes ethylene carbonate. The electrolyte further includes ethylene carbonate, butylene carbonate, and dimethoxyethane. The electrolyte includes dioxolane. The cell is a primary cell.

In another aspect, the invention features an electrochemical cell, including a cathode having manganese oxide; an anode having lithium; an aluminum surface or an aluminum couple; and an electrolyte having lithium trifluoromethanesulfonate and $LiBF_4$.

Embodiments may include one or more of the following features. The electrolyte includes from about 300 ppm to about 40,000 ppm of $LiBF_4$. The electrolyte further includes a third lithium salt selected from the group consisting of $LiPF_6$ and lithium trifluoromethanesulphonylimide. The electrolyte includes from about 300 ppm to about 35,000 ppm of $LiBF_4$. The electrolyte further includes a material selected from the group consisting of ethylene carbonate, propylene carbonate, dimethoxyethane, butylene carbonate, and dioxolane. The electrolyte further includes propylene carbonate and dimethoxyethane. The electrolyte further includes ethylene carbonate. The electrolyte further includes ethylene carbonate, butylene carbonate, and dimethoxyethane. The electrolyte includes dioxolane. The cell is a primary cell.

In another aspect, the invention features a method, including discharging an electrochemical cell having a cathode including manganese oxide, an anode including lithium, and an electrolyte including lithium trifluoromethanesulfonate and $LiBF_4$; and disposing the cell without recharging the cell. The electrolyte can further include $LiPF_6$.

Other aspects, features, and advantages are in the description, drawings, and claims.

DETAILED DESCRIPTION

Figure 1:
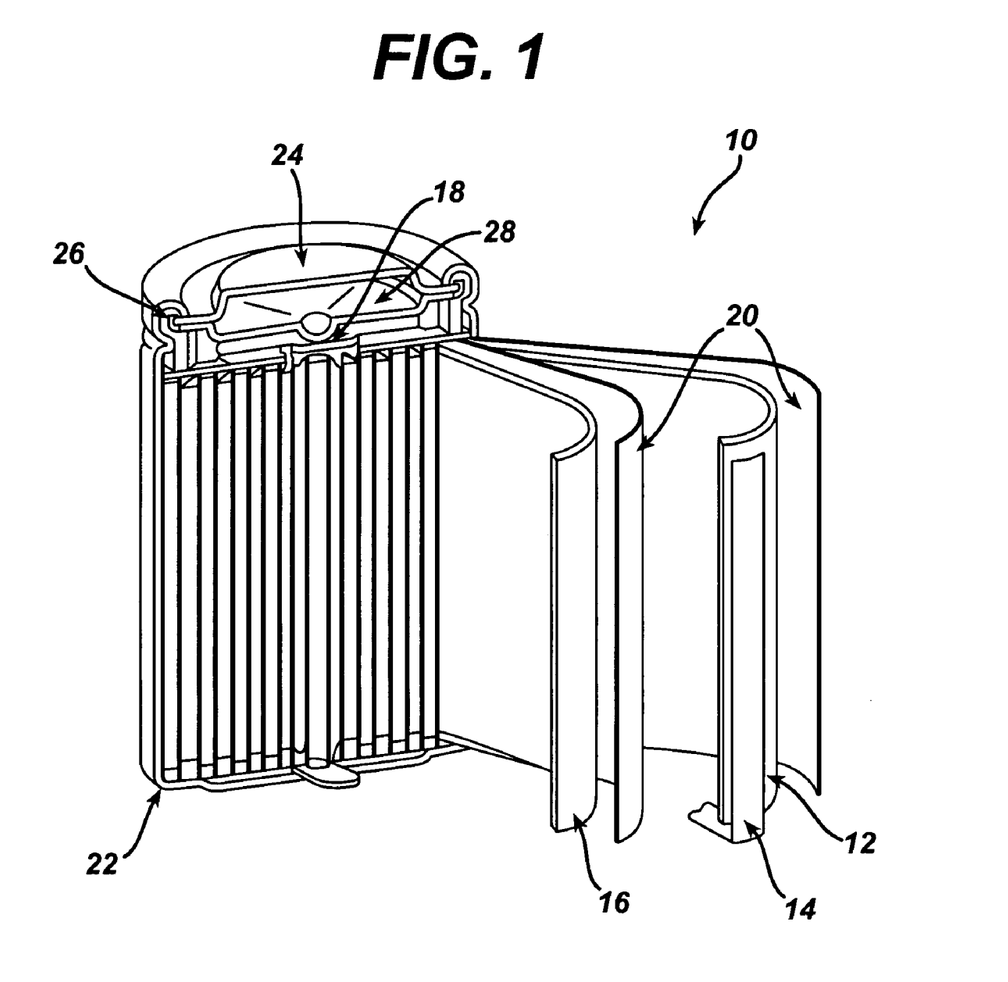
FIG. 1 is a sectional view of a non-aqueous electrochemical cell.

Referring to FIG. 1, an electrochemical cell 10 (such as a primary lithium cell) includes an anode 12 in electrical contact with a negative lead 14, a cathode 16 in electrical contact with a positive lead 18, a separator 20 and an electrolytic solution. Anode 12, cathode 16, separator 20 and the electrolytic solution are contained within a case 22. The electrolytic solution includes a solvent system and a salt that is at least partially dissolved in the solvent system. Electrochemical cell 10 further includes a cap 24 and an annular insulating gasket 26, as well as a safety valve 28.

The electrolytic solution or electrolyte can be in liquid, solid or gel (e.g., polymer) form. The electrolyte can contain an organic solvent such as propylene carbonate (PC), ethylene carbonate (EC), dimethoxyethane (DME), butylene carbonate (BC), dioxolane (DO), tetrahydrofuran (THF), acetonitrile ($CH_3CN$), gamma-butyrolactone, diethyl carbonate (DEC), dimethyl carbonate (DMC), ethyl methyl carbonate (EMC), dimethylsulfoxide (DMSO), methyl acetate (MA), methyl formiate (MF), sulfolane, or combinations thereof. The electrolyte can alternatively contain an inorganic solvent such as $SO_2$ or $SOCl_2$.

The electrolyte also can contain $LiBF_4$ and one or more other lithium salts, such as lithium trifluoromethanesulfonate (LiTFS), lithium trifluoromethanesulphonylimide (LiTFSI), and $LiPF_6$. For example, the electrolyte can include a mixture of LiTFS and $LiBF_4$; a mixture of LiTFS, LiTFSI, and $LiBF_4$; or a mixture of LiTFS, $LiPF_6$, and $LiBF_4$. Without wishing to be bound by theory, it is believed that $LiBF_4$ can reduce (e.g., inhibit or suppress) the occurrence of corrosion, such as when cell 10 includes an aluminum component (e.g., an aluminum cathode current collector) or an aluminum couple by passivating the aluminum component or couple through fluorination. A couple generally includes at least two metal or metal alloy surfaces that are in electrical contact with each other. As an example, cathode 16 can include an aluminum current collector that is in electrical contact with positive lead 18, which can be made of steel. The two metal surfaces that are in electrical contact with each other can have the same composition (e.g., both surfaces can be made of the same metal or metal alloy (e.g., both surfaces are made of aluminum)), or can have different compositions (e.g., the two surfaces can be made of different metals or metal alloys (e.g., one surface is made of aluminum and the other surface is made of an alloy of aluminum)). A surface can have an interface between two portions having the same composition. The interface can have a different composition than the portions, e.g., due to wetting and diffusion.

In embodiments in which the electrolyte includes a salt mixture having LiTFS and $LiPF_6$, the total concentration of salts in the mixture of solvent(s) can range from about 0.2 M to about 1.2 M. The total concentration of LiTFS and $LiPF_6$ in the mixture of solvent(s) can be equal to or greater than about 0.20 M, 0.25 M, 0.30 M, 0.35 M, 0.40 M, 0.45 M, 0.50 M, 0.55 M, 0.60 M, 0.65 M, 0.70 M, 0.75 M, 0.80 M, 0.85 M, 0.90 M, 0.95 M, 1.00 M, 1.05 M, 1.10 M, or 1.15 M; and/or equal to or less than about 1.2 M, 1.15 M, 1.10 M, 1.05 M, 1.00 M, 0.95 M, 0.90 M, 0.85 M, 0.80 M, 0.75 M, 0.70 M, 0.65 M, 0.60 M, 0.55 M, 0.50 M, 0.45 M, 0.40 M, 0.35 M, 0.30 M, or 0.25 M. Of the total concentration of LiTFS and $LiPF_6$ salts, the concentration of LiTFS in the mixture of solvents can be (in mole fraction) from about five percent to about 95 percent. For example, the concentration of LiTFS in the mixture of solvents can be (in mole fraction) equal to or greater than five percent, ten percent, 15 percent, 20 percent, 25 percent, 30 percent, 35 percent, 40 percent, 45 percent, 50 percent, 55 percent, 60 percent, 65 percent, 70 percent, 75 percent, 80 percent, 85 percent, or 90 percent; and/or equal to or less than 95 percent, 90 percent, 85 percent, 80 percent, 75 percent, 70 percent, 65 percent, 60 percent, 55 percent, 50 percent, 45 percent, 40 percent, 35 percent, 30 percent, 25 percent, 20 percent, 15 percent, or ten percent. The concentration of $LiPF_6$ in the mixture of solvents can be equal to 100 percent minus the concentration of LiTFS in the mixture of solvents. For example, if the total concentration of salt in the mixture of solvents is 0.5 M, and the LiTFS concentration (in mole fraction) in the mixture of solvents is 90 percent (i.e., 0.45 M), then the $LiPF_6$ concentration in the electrolyte mixture is ten percent (i.e., 0.05 M).

In embodiments in which the electrolyte includes LiTFS, the concentration of the LiTFS can range from about 0.2 M to about 1.2 M. The concentration of LiTFS in the mixture of solvent(s) can be equal to or greater than about 0.20 M, 0.25 M, 0.30 M, 0.35 M, 0.40 M, 0.45 M, 0.50 M, 0.55 M, 0.60 M, 0.65 M, 0.70 M, 0.75 M, 0.80 M, 0.85 M, 0.90 M, 0.95 M, 1.00 M, 1.05 M, 1.10 M, or 1.15 M; and/or equal to or less than about 1.2 M, 1.15 M, 1.10 M, 1.05 M, 1.00 M, 0.95 M, 0.90 M, 0.85 M, 0.80 M, 0.75 M, .70 M, 0.65 M, 0.60 M, 0.55 M, 0.50 M, 0.45 M, 0.40 M, 0.35M, 0.30 M, or 0.25 M.

In embodiments in which the electrolyte includes a salt mixture having LiTFS and LiTFSI, the total concentration of salts in the mixture of solvent(s) can range from about 0.2 M to about 1.2 M. The total concentration of LiTFS and LiTFSI in the mixture of solvent(s) can be equal to or greater than about 0.20 M, 0.25 M, 0.30 M, 0.35 M, 0.40 M, 0.45 M, 0.50 M, 0.55 M, 0.60 M, 0.65 M, 0.70 M, 0.75 M, 0.80 M, 0.85 M, 0.90 M, 0.95 M, 1.00 M, 1.05 M, 1.10 M, or 1.15 M; and/or equal to or less than about 1.2 M, 1.15 M, 1.10 M, 1.05 M, 1.00 M, 0.95 M, 0.90 M, 0.85 M, 0.80 M, 0.75 M, 0.70 M, 0.65 M, 0.60 M, 0.55 M, 0.50 M, 0.45 M, 0.40 M, 0.35 M, 0.30 M, or 0.25 M. Of the total concentration of LiTFS and LiTFSI salts, the concentration of LiTFS in the mixture of solvents can be (in mole fraction) from about five percent to about 95 percent. For example, the concentration of LiTFS in the mixture of solvents can be (in mole fraction) equal to or greater than about five percent, ten percent, 15 percent, 20 percent, 25 percent, 30 percent, 35 percent, 40 percent, 45 percent, 50 percent, 55 percent, 60 percent, 65 percent, 70 percent, 75 percent, 80 percent, 85 percent, or 90 percent; and/or equal to or less than about 95 percent, 90 percent, 85 percent, 80 percent, 75 percent, 70 percent, 65 percent, 60 percent, 55 percent, 50 percent, 45 percent, 40 percent, 35 percent, 30 percent, 25 percent, 20 percent, 15 percent, or ten percent. The concentration of LiTFSI in the mixture of solvents can be equal to 100 percent minus the concentration of LiTFS in the mixture of solvents. For example, if the total concentration of salt in the mixture of solvents is 0.5 M, and the LiTFS concentration (in mole fraction) in the mixture of solvents is 90 percent (i.e., 0.45 M), then the LiTFSI concentration in the electrolyte mixture is ten percent (i.e., 0.05 M).

As indicated above, in addition to the lithium salt(s) above, the electrolyte further includes $LiBF_4$. In some embodiments, the electrolyte includes from about 300 ppm to about 40,000 ppm (relative to electrolyte) of $LiBF_4$, in addition to the other lithium salts. The electrolyte can include equal to or greater than about 300 ppm, 500 ppm, 1,000 ppm, 1,500 ppm, 2,000 ppm, 2,500 ppm, 3,000 ppm, 3,500 ppm, 5,000 ppm, 10,000 ppm, 15,000 ppm, 20,000 ppm, 25,000 ppm, 30,000 ppm, or 35,000 ppm of $LiBF_4$; and/or less than or equal to about 40,000 ppm, 35,000 ppm, 30,000 ppm, 25,000 ppm, 20,000 ppm, 15,000 ppm, 10,000 ppm, 5,000 ppm, 4,000 ppm, about 3,500 ppm, about 3,000 ppm, about 2,500 ppm, 2,000 ppm, about 1,500 ppm, about 1,000 ppm, or about 500 ppm of $LiBF_4$.

More specifically, in embodiments in which the electrolyte includes LiTFS and $LiBF_4$, the concentration of $LiBF_4$ can range from about 300 ppm to about 35,000 ppm. The electrolyte can include equal to or greater than about 300 ppm, 500 ppm, 1,000 ppm, 1,500 ppm, 2,000 ppm, 2,500 ppm, 3,000 ppm, 3,500 ppm, 5,000 ppm, 10,000 ppm, 15,000 ppm, 20,000 ppm, 25,000 ppm, or 30,000 ppm of $LiBF_4$; and/or less than or equal to about 35,000 ppm, 30,000 ppm, 25,000 ppm, 20,000 ppm, 15,000 ppm, 10,000 ppm, 5,000 ppm, 4,000 ppm, about 3,500 ppm, about 3,000 ppm, about 2,500 ppm, 2,000 ppm, about 1,500 ppm, about 1,000 ppm, or about 500 ppm of $LiBF_4$.

In embodiments in which the electrolyte includes LiTFS, LiTFSI and $LiBF_4$, the concentration of $LiBF_4$ can range from about 300 ppm to about 40,000 ppm. The electrolyte can include equal to or greater than about 300 ppm, 500 ppm, 1,000 ppm, 1,500 ppm, 2,000 ppm, 2,500 ppm, 3,000 ppm, 3,500 ppm, 5,000 ppm, 10,000 ppm, 15,000 ppm, 20,000 ppm, 25,000 ppm, 30,000 ppm, or 35,000 ppm of $LiBF_4$; and/or less than or equal to about 40,000 ppm, 35,000 ppm, 30,000 ppm, 25,000 ppm, 20,000 ppm, 15,000 ppm, 10,000 ppm, 5,000 ppm, 4,000 ppm, about 3,500 ppm, about 3,000 ppm, about 2,500 ppm, 2,000 ppm, about 1,500 ppm, about 1,000 ppm, or about 500 ppm of $LiBF_4$.

In embodiments in which the electrolyte includes LiTFS, $LiPF_6$ and $LiBF_4$, the concentration of $LiBF_4$ can range from about 300 ppm to about 10,000 ppm. The electrolyte can include equal to or greater than about 300 ppm, 500 ppm, 1,000 ppm, 1,500 ppm, 2,000 ppm, 2,500 ppm, 3,000 ppm, 3,500 ppm, 5,000 ppm, or 10,000 ppm of $LiBF_4$; and/or less than or equal to about 10,000 ppm, 5,000 ppm, 4,000 ppm, about 3,500 ppm, about 3,000 ppm, about 2,500 ppm, 2,000 ppm, about 1,500 ppm, about 1,000 ppm, or about 500 ppm of $LiBF_4$.

In addition to the salts, the electrolyte includes a mixture of one or more solvents. Examples of solvent mixtures include DME and PC; EC, PC, and DME; EC, BC, and DME; and dioxolane. In a mixture of solvents having DME and PC, the concentration of DME in the mixture of solvents can range from about 30 percent to about 90 percent by weight. The concentration of DME in the mixture of solvents can be equal to or greater than about 30 percent, 35 percent, 40 percent, 45 percent, 50 percent, 55 percent, 60 percent, 65 percent, 70 percent, 75 percent, 80 percent by weight, or 85 percent by weight; and/or equal to or less than about 90 percent, 85 percent, 80 percent, 75 percent, 70 percent, 65 percent, 60 percent, 55 percent, 50 percent, 45 percent, 40 percent, or 35 percent by weight. The concentration of PC in the mixture of solvents can be equal to 100 percent minus the concentration of DME. For example, if the concentration of DME in the mixture of solvents is 75 percent by weight, then the concentration of PC in the mixture of solvents is 25 percent by weight. If the concentration of DME in the mixture of solvents is 50-75 percent by weight, then the concentration of PC in the mixture of solvents is 25-50 percent by weight.

In a mixture of solvents including EC, DME and PC, the concentration of EC in the mixture of solvents can be from about five percent to about 30 percent by weight. The concentration of EC in the mixture of solvents can be equal to or greater than five percent, ten percent, 15 percent, 20 percent, or 25 percent by weight; and/or equal to or less than 30 percent, 25 percent, 20 percent, 15 percent, or ten percent by weight. The concentration of DME in the mixture of solvents can range from about 30 percent to about 90 percent by weight. The concentration of DME in the mixture of solvents can be equal to or greater than 30 percent, 35 percent, 40 percent, 45 percent, 50 percent, 55 percent, 60 percent, 65 percent, 70 percent, 75 percent, 80 percent, or 85 percent by weight; and/or equal to or less than about 90 percent, 85 percent, 80 percent, 75 percent, 70 percent, 65 percent, 60 percent, 55 percent, 50 percent, 45 percent, 40 percent, or 35 percent by weight. The concentration of PC in the mixture of solvents can be equal to 100 percent minus the concentration of EC and DME. For example, if the concentration of EC in the mixture of solvents is 15 percent by weight, and the concentration of DME in the mixture of solvents is 60 percent by weight, then the concentration of PC in the mixture of solvents is 25 percent by weight. Examples of an EC:DME:PC solvent mixture are 14:62:24 and 10:75:15 percent by weight.

A mixture of solvents including EC:BC:DME can have generally the same concentrations described above as for EC:PC:DME, respectively.

Cathode 16 includes an active cathode material, which is generally coated on the cathode current collector. The current collector can include a steel, such as a stainless steel (e.g., a series 200 stainless steel, a 300 series stainless steel, a 400 series stainless steel, or cold rolled steel); aluminum (e.g., in the form of an aluminum foil); an alloy including aluminum; titanium; or nickel. In some embodiments, the current collector can be a metal grid. The current collector generally has at least one dimension (e.g., a length, a width, and/or a diameter) that is greater than about 0.2 millimeter (e.g., greater than about 0.5 millimeter, greater than about one millimeter, greater than about 1.5 millimeters, greater than about two millimeters). The active material can be, e.g., a metal oxide, a halide, or a chalcogenide; alternatively, the active material can be sulfur, an organosulfur polymer, or a conducting polymer. Specific examples include manganese oxides (such as $MnO_2$), cobalt oxides, lithium mixed metal (e.g., Co, Ni, Cr) oxides, manganese spinels, $V_2O_5$, $CoF_3$, molybdenum-based materials such as $MoS_2$ and $MoO_3$, $FeS_2$, $SOCl_2$, S, and $(C_6H_5)_n$ and $(S_3N_2)_n$, where n is at least two. The active material can also be a carbon monofluoride. An example is a compound having the formula $CF_x$, where x is from 0.5 to one, or higher. The active material can be mixed with a conductive material such as carbon and a binder such as polytetrafluoroethylene (PTFE) or Kraton (available from Shell). An example of a cathode is one that includes aluminum foil coated with $MnO_2$. The cathode can be prepared as described in U.S. Pat. No. 4,279,972. Specific cathode materials are a function of, e.g., the type of cell (such as primary or secondary).

In some embodiments, cathode 16 contains a low amount of water. Without wishing to be bound by theory, it is believed that in the presence of water, $LiPF_6$ and $LiBF_4$ can hydrolyze to form hydrofluoric acid, which tends to corrode the components of cell 10 at an accelerated rate. By reducing the amount of water in cathode 16, the formation of hydrofluoric acid is reduced, thereby enhancing the performance of cell 10. In some embodiments, cathode 16 includes from about 50 ppm to about 2,000 ppm of water. For example, cathode 16 can include less than or equal to about 2,00 ppm, about 1,500 ppm, about 1,000 ppm, about 500 ppm, or about 100 ppm of water; and/or greater than or equal to about 50 ppm, about 100 ppm, about 500 ppm, about 1,000 ppm, or about 1,500 ppm of water. In comparison, certain cathode materials, such as manganese dioxide, can contain up to 2% by weight water. The amount of water in cathode 16 can be controlled, for example, by only exposing the cathode to dry environments, such as a dry box, and/or by heating the cathode material (e.g., at about 200° C. under vacuum). Manganese oxide cathode material is available from, for example, Kerr McGee, Delta, or Chem-Metals. In some embodiments, the water content in cell 10 can be slightly higher than the water content of cathode 16, such as when the electrolyte contains a small amount of water (e.g., a maximum of about 50 ppm).

As used herein, the water content of cathode 16 is determined experimentally using standard Karl Fisher titrimetry. For example, moisture detection can be performed using a Mitsubishi moisture analyzer (such as CA-05 or CA-06) with a pyrolizing unit (VA-05 or VA-21) set at 110-115° C.

Anode 12 can include an active anode material, usually in the form of an alkali metal (e.g., lithium, sodium, potassium) or an alkaline earth metal (e.g., calcium, magnesium). The anode can include an alloy of an alkali metal (e.g., lithium) and an alkaline earth metal or an alloy of an alkali metal and aluminum. The anode can be used with or without a substrate. The anode also can include an active anode material and a binder. In this case an active anode material can include tin-based materials, carbon-based materials, such as carbon, graphite, an acetylenic mesophase carbon, coke, a metal oxide and/or a lithiated metal oxide. The binder can be, for example, PTFE. The active anode material and binder can be mixed to form a paste which can be applied to the substrate of anode 12. Specific anode materials are a function of, for example, the type of cell (such as primary or secondary).

Separator 20 can be formed of any of the standard separator materials used in electrochemical cells. For example, separator 20 can be formed of polypropylene (e.g., nonwoven polypropylene or microporous polypropylene), polyethylene, a polysulfone, or combinations thereof.

Case 22 can be made of a metal (e.g., aluminum, an aluminum alloy, nickel, nickel plated steel) or a plastic (e.g., polyvinyl chloride, polypropylene, polysulfone, ABS or a polyamide).

Positive lead 18 and/or cap 24 can be made of, for example, aluminum, nickel, titanium, or steel.

Electrochemical cell 10 can be a primary cell or a secondary cell. Primary electrochemical cells are meant to be discharged, e.g., to exhaustion, only once, and then discarded.

Primary cells are not intended to be recharged. Primary cells are described, for example, in David Linden, Handbook of Batteries (McGraw-Hill, 2d ed. 1995). Secondary electrochemical cells can be recharged for many times, e.g., more than fifty times, more than a hundred times, or more. In some cases, secondary cells can include relatively robust separators, such as those having many layers and/or that are relatively thick. Secondary cells can also be designed to accommodate for changes, such as swelling, that can occur in the cells. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference.

To assemble the cell, separator 20 can be cut into pieces of a similar size as anode 12 and cathode 16, and placed between the electrodes, as shown in FIG. 1. Anode 12, cathode 16, and separator 20 are then placed within case 22, which is then filled with the electrolytic solution and sealed. One end of case 22 is closed with cap 24 and annular insulating gasket 26, which can provide a gas-tight and fluid-tight seal. Positive lead 18 connects cathode 16 to cap 24. Safety valve 28 is disposed in the inner side of cap 24 and is configured to decrease the pressure within electrochemical cell 10 when the pressure exceeds some predetermined value. Additional methods for assembling the cell are described in U.S. Pat. Nos. 4,279,972; 4,401,735; and 4,526,846.

Other configurations of electrochemical cell 10 can also be used, including, e.g., the coin cell configuration or prismatic cells. The electrochemical cells can be of different voltages, e.g., 1.5 V, 3.0 V, or 4.0 V.

The invention is further described in the following examples, which do not limit the scope of the invention described in the claims. In the examples, the cells were assembled using the procedures described in U.S. Ser. No. 10/719,056; U.S. Ser. No. 10/719,025; and U.S. Ser. No. 10/719,014, all filed Nov. 24, 2003, and all incorporated by reference.

Glass Cell Experimentation

An electrochemical glass cell was constructed having an Al working electrode, a Li reference electrode, and two Li auxiliary electrodes. The working electrode was fabricated from a 99.999% Al rod inserted into a Teflon sleeve to provide a planar electrode area of 0.33 cm. The native oxide layer was removed by first polishing the planar working surface with 3 μm aluminum oxide paper under an argon atmosphere, followed by thorough rinsing of the Al electrode in an electrolyte. All experiments were performed in a glove box with controlled humidity (less than 5 ppm) under an Ar atmosphere.

Cyclic Voltammetry

Corrosion current measurements were made according to a modified procedure generally described in X. Wang et al., *Electrochemica Acta*, vol. 45, pp. 2677-2684 (2000). The corrosion potential of Al was determined by continuous cyclic voltammetry. In each cycle, the potential was initially set to an open circuit potential, then anodically scanned to +4.5 V and reversed to an open circuit potential. A scan rate of 50 mV/s was selected, at which good reproducibility of the corrosion potential of aluminum was obtained. The corrosion potential of aluminum was defined as the potential at which the anodic current density reached $10^{-4}$ A/cm$^2$ at the first cycle.

Chronoamperometry

Corrosion current measurements were made according to the procedure described in EP 0 852 072. The aluminum electrode was polarized at various potentials vs. a Li reference electrode while the current was recorded vs. time. Current vs. time measurements were taken during a 30-minute period. The area under the current vs. time curve was used as a measure of the amount of aluminum corrosion occurring. The experiment also could be terminated in case the current density reached 3 mA/cm$^2$ before the 30 minute time period elapsed and no corrosion suppression occurred. Corrosion suppression occurred when the resulting current density was observed in the range of $10^{-6}$ A/cm$^2$.

EXAMPLE 1

Al Corrosion in LiTFS Containing Electrolyte with Addition of LiBF$_4$

Figure 2:
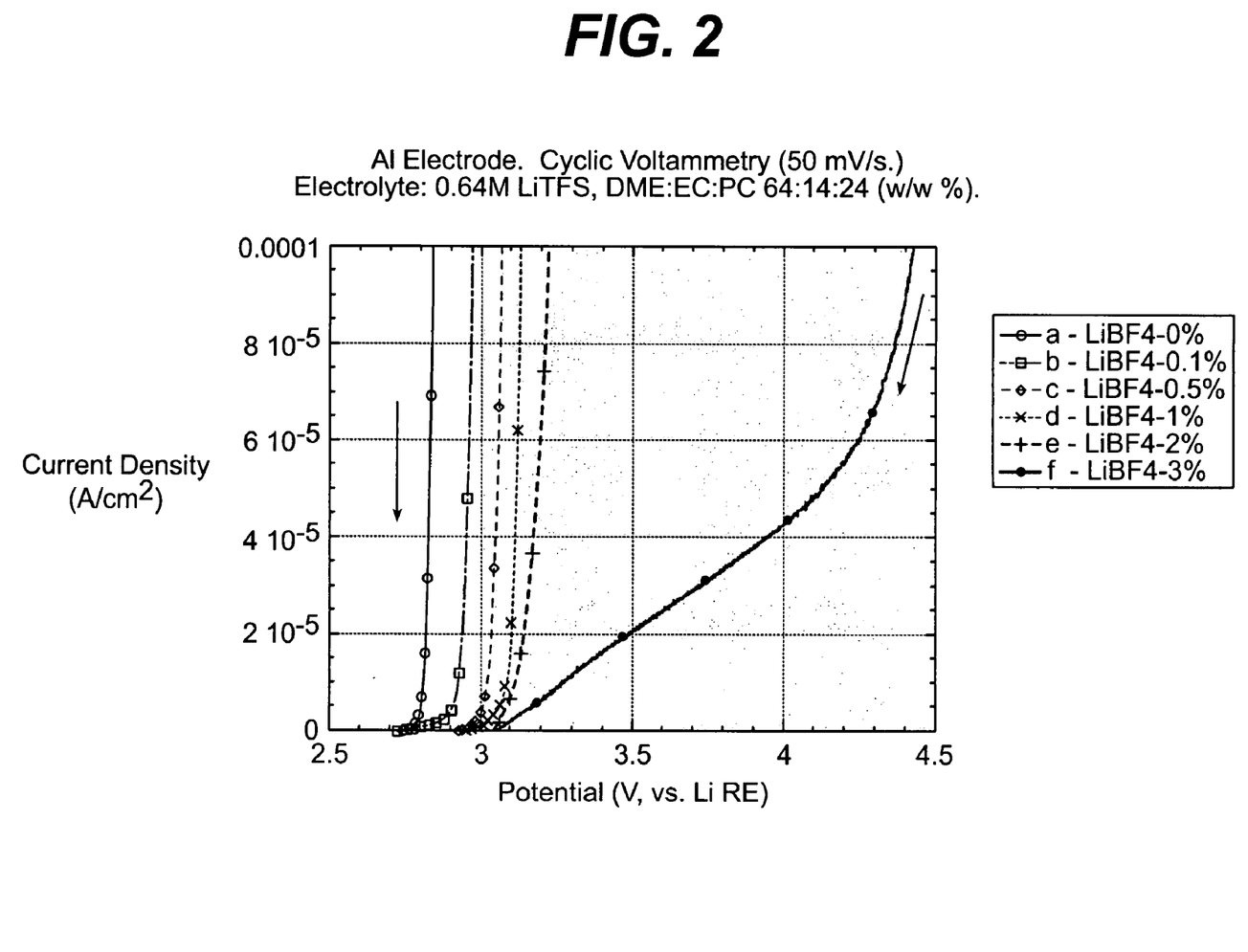
FIG. 2 is a graph showing current density versus potential.

Referring to FIG. 2, cyclic voltammograms taken in the electrolyte containing LiTFS and DME:EC:PC showed significant shifts in the corrosion potential of the Al electrode. The addition of LiBF$_4$ to the electrolyte shifted the potential of aluminum in the positive direction, which is believed to indicate corrosion suppression.

Curves in FIG. 2 show the cyclic voltammograms of the aluminum electrode in the electrolyte containing different concentrations of LiBF$_4$ (from 0 to 3 w/w %). The addition of 0.1% of LiBF$_4$ to the electrolyte shifted the potential of the aluminum 127 mV in the positive direction (curve "b"); the addition of 0.5% of LiBF$_4$ to the electrolyte shifted the potential 228 mV (curve "c"); the addition of 1% of LiBF$_4$ to the electrolyte shifted the potential 284 mV (curve "d"); the addition of 2% of LiBF$_4$ to the electrolyte shifted the potential 380 mV (curve "e"); and the addition of 3% of LiBF$_4$ to the electrolyte shifted the potential 1580 mV (curve "f"). It is believed that these results demonstrate that the addition of increasing amounts of LiBF$_4$ to the electrolyte containing LiTFS salt and mixture of DME:EC:PC results in increasing degrees of corrosion protection of the aluminum electrode. The electrochemical window of Al stability can be extended as high as +4.42 V (vs. a Li reference electrode) by increasing the concentration of LiBF$_4$ to 3 w/w %. At a LiBF$_4$ concentration of 3%, aluminum corrosion is believed to be effectively suppressed at 4.42 V.

EXAMPLE 2

Al Corrosion in LiTFS+LiTFSI Containing Electrolyte with Addition of LiBF$_4$

Figure 3:
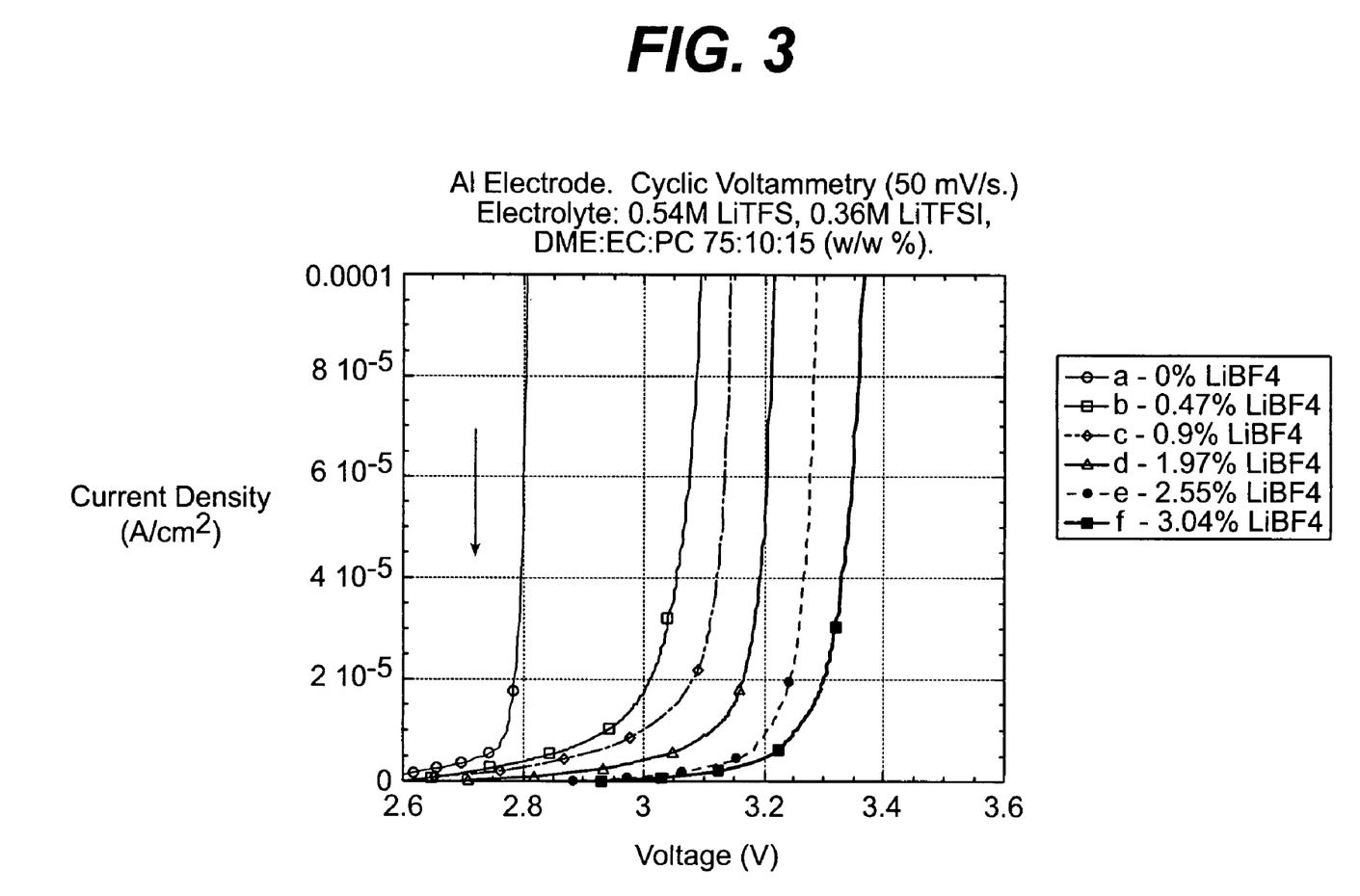
FIG. 3 is a graph showing current density versus voltage.

Referring to FIG. 3, curve "a" shows the corrosion potential of an aluminum electrode subjected to an electrolyte containing a mixture of LiTFS and LiTFSI salts, DME:EC:PC, and no LiBF$_4$. The addition of 0.47% of LiBF$_4$ to the electrolyte shifted the potential of the aluminum 283 mV in the positive direction (curve "b"); the addition of 0.9% of LiBF$_4$ to the electrolyte shifted the potential 336 mV (curve "c"); the addition of 1.97% of LiBF$_4$ to the electrolyte shifted the potential 408 mV (curve "d"); the addition of 2.55% of LiBF$_4$ to the electrolyte shifted the potential 480 mV (curve "e"); and the addition of 3.04% of LiBF$_4$ to the electrolyte shifted the potential 558 mV (curve "f"). It is believed that these results demonstrate that the addition of increasing amounts of LiBF$_4$ to the electrolyte containing LiTFS salt and mixture of DME:EC:PC results in increasing degrees of corrosion protection of the aluminum electrode.

EXAMPLE 3

Al Corrosion in LiTFS+LiPF$_6$ Containing Electrolyte with Addition of LiBF$_4$

Figure 4:
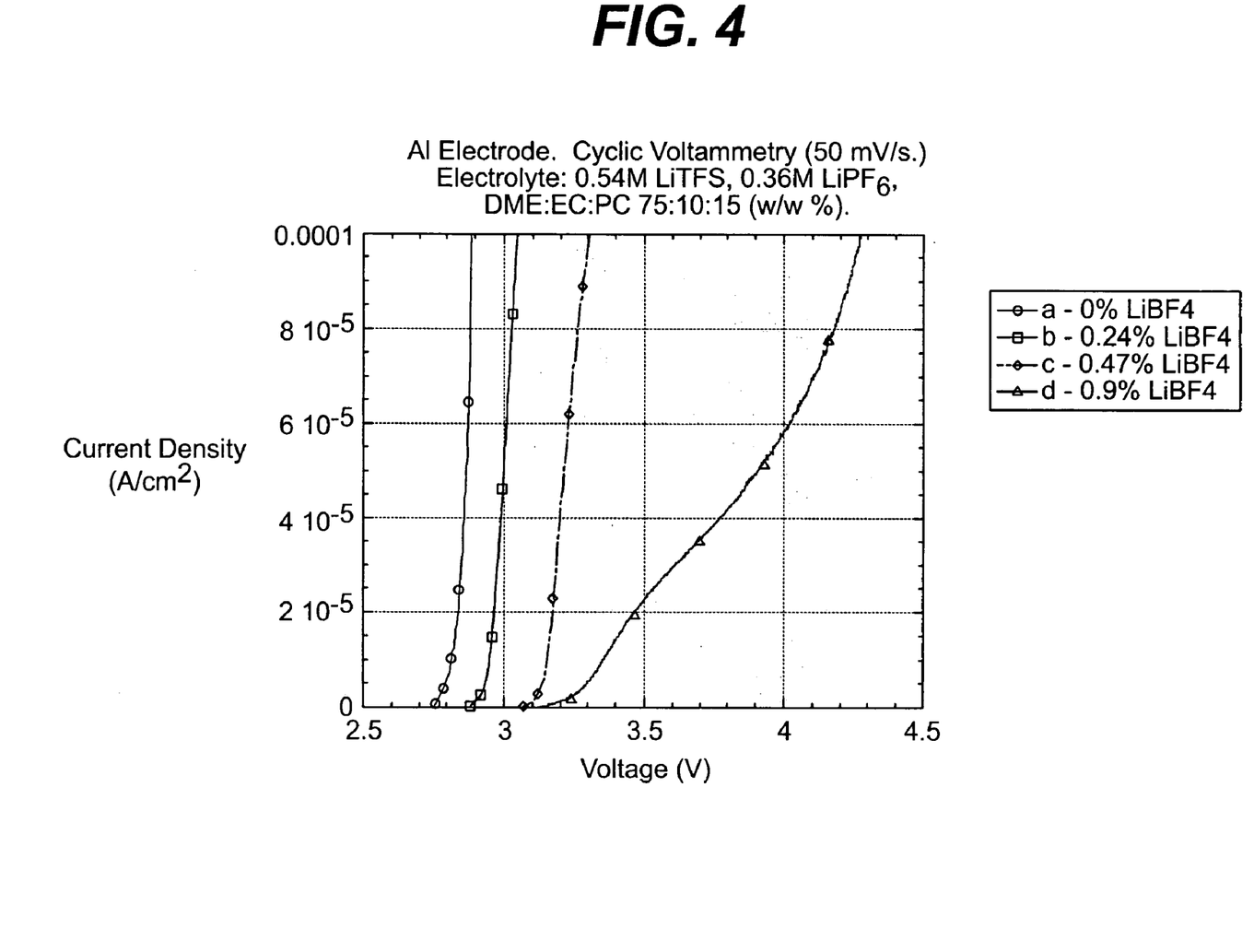
FIG. 4 is a graph showing current density versus voltage.

Referring to FIG. 4, curve "a" shows the corrosion potential of the aluminum subjected to an electrolyte containing a mixture of LiTFS and LiPF$_6$ salts, DME:EC:PC, and no LiBF$_4$. The addition of 0.24% of LiBF$_4$ to this electrolyte shifted the corrosion potential of the aluminum 161 mV in the positive direction (curve "b"); the addition of 0.47% of LiBF$_4$ to the electrolyte shifted the potential 423 mV (curve "c"); and the addition of 0.9% of LiBF$_4$ to the electrolyte shifted the potential 1389 mV (curve "d"). It is believed that these results demonstrate that the addition of increasing amounts of LiBF$_4$ to the electrolyte containing the mixture of LiTFS, LiPF$_6$ salts, and DME:EC:PC results in increasing degrees of corrosion protection of the aluminum electrode. The electrochemical window of Al stability can be extended as high as +4.27 V (vs. a Li reference electrode) by increasing the concentration of LiBF$_4$ to 0.9 w/w %. At a LiBF$_4$ concentration of 0.9%, aluminum corrosion is believed to be effectively suppressed at 4.27 V.

Figure 5:
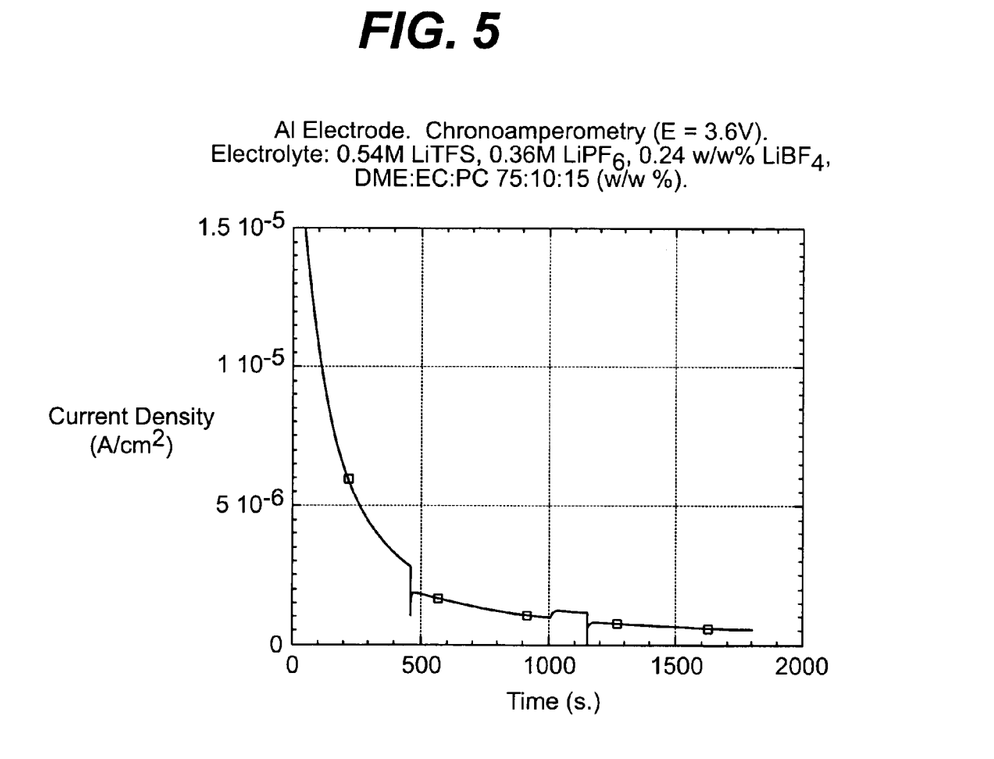
FIG. 5 is a graph showing current density versus time.

Referring to FIG. 5, a curve shows a chronoamperogram of the aluminum electrode exposed to the electrolyte containing LiTFS, LiPF$_6$, DME:EC:PC with 0.24% LiBF$_4$ added. As shown in FIG. 5, at a LiBF$_4$ concentration of 0.24%, the aluminum corrosion at +3.6 V (vs. a Li reference electrode) is believed to be effectively suppressed, and the corrosion current is less than $10^{-6}$ A/cm$^2$ after 30 minutes of measurement.

EXAMPLE 4

Al Corrosion Potential in Different Electrolytes with Addition of LiBF$_4$

Figure 6:
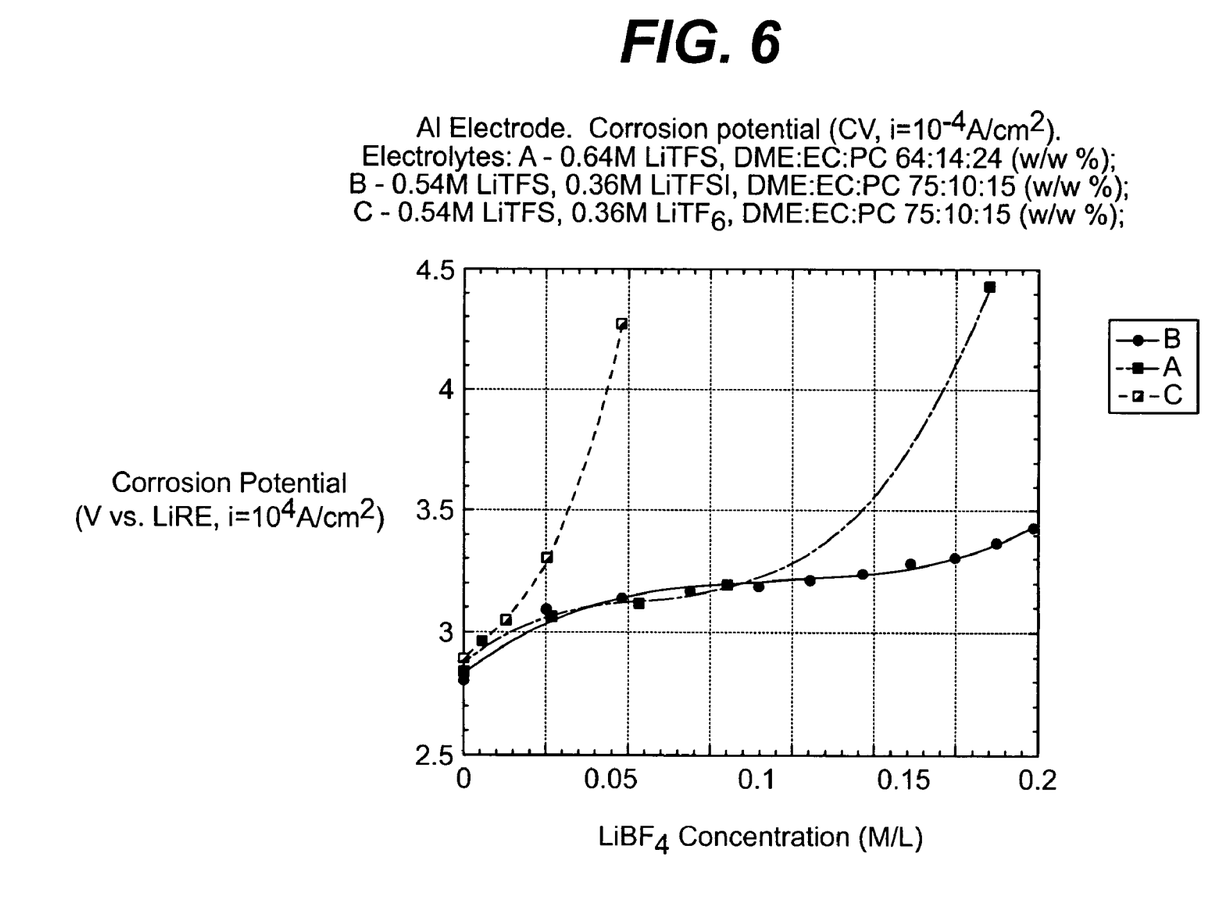
FIG. 6 is a graph showing corrosion potential versus $LiBF_4$ concentration.

Referring to FIG. 6, curves A, B, and C show the corrosion potential of the aluminum electrode subjected to electrolytes of different composition containing a different concentration of LiBF$_4$. Curve A shows the corrosion potential of the aluminum subjected to electrolyte containing LiTFS and DME:EC:PC and different concentrations of LiBF$_4$. The addition of 0.318M of LiBF$_4$ to this electrolyte shifted the corrosion potential of the aluminum 1580 mV in the positive direction and is believed to effectively suppress corrosion of Al. Curve B shows the corrosion potential of the aluminum subjected to electrolyte containing LiTFS +LiTFSI and DME:EC:PC and different concentrations of LiBF$_4$. The addition of 0.35M of LiBF$_4$ to this electrolyte shifted the corrosion potential of the aluminum 558 mV in the positive direction. Curve C shows the corrosion potential of the aluminum subjected to electrolyte containing LiTFS +LiPF$_6$ and DME:EC:PC and different concentrations of LiBF$_4$. The addition of 0.096M of LiBF$_4$ to this electrolyte shifted the corrosion potential of the aluminum 1389 mV in the positive direction. A lower concentration of LiBF$_4$ is needed to effectively suppress corrosion of Al in an electrolyte containing LiTFS+LiPF$_6$ compare to the electrolytes containing LiTFS and LiTFS+LiTFSI: 0.096 M vs 0.35M. It is believed that this difference is indicative of a synergistic effect of LiBF$_4$ and LiPF$_6$ salts combination for suppression of Al corrosion.

EXAMPLE 6

Storage Performance

Referring to Table 1, the performance of test cells after storage for 20 days at 60° C. is shown. Table 1 shows performance data for test cells under a "digital camera" test at room temperature.

The digital camera test is used to simulate working conditions in digital camera. The test includes subjecting the test cells to number of pulses under constant power withdrawal and measuring voltage. The test was performed using Arbin testing system, available from Arbin Co.

Ten prismatic cells filled with electrolyte (battery grade) supplied by Ferro Co. having 0.54M LiTFS, 0.36M LiPF$_6$, and 0.9 w/w % of LiBF$_4$ were included in an experimental group. Cathodes with Al current collectors were used for the experimental group. The cathode moisture content for the experimental group was in the range of 400-600 ppm.

Ten prismatic cells filled with a "control" electrolyte (battery grade) supplied by Ferro Co. having 0.54M LiTFS, 0.36M LiTFSI, and 0.25 w/w % LiClO$_4$ were included in a control group. Cathodes with Al current collectors were used for the control group. The cathode moisture content for the control group was in the range of 400-600 ppm.

After assembling, the prismatic cells were subjected to a storage test in which the cells were stored for 20 days in a dispatch oven at 60° C.

As shown in Table 1, the cells including the electrolyte containing 0.54M LiTFS, 0.36M LiPF$_6$, and 0.9 w/w % of LiBF$_4$ exhibit post-storage performance comparable to the cells including the control electrolyte (0.54M LiTFS, 0.36M LiTFSI, and 0.25 w/w % LiClO$_4$). "Performance vs. Control" was calculated as a ratio (%) of delivered pulses of experimental and control groups after storage.

TABLE 1

| Test | Control group | Experimental group | Performance vs. Control (%) |
|---|---|---|---|
| RT, 2.0 V | 230 | 232 | 100.9 |
| RT, 1.7 V | 255 | 250 | 98.0 |
| RT, 1.5 V | 267 | 259 | 97.0 |

All publications, patents, and patent applications referred to in this application are herein incorporated by reference to the same extent as if each individual publication, patent, or patent application was specifically and individually indicated to be incorporated by reference.

Other embodiments are within the claims.

What is claimed is:

1. A primary electrochemical cell, comprising (1) a cathode including an active cathode material selected from the group consisting of manganese dioxide and iron disulfide, the active cathode material including water, (2) an anode comprising lithium (3) an aluminum couple, and (4) an electrolyte, in contact with a surface of the aluminum couple, and comprising (a) from about 300 ppm to about 10,000 ppm of LiBF$_4$ to reduce corrosion of the aluminum couple, (b) LiPF$_6$, and (c) a third lithium salt selected from the group consisting of lithium trifluoromethanesulfonate and lithium trifluoromethanesulphonylimide.

2. The cell of claim 1, wherein the third lithium salt comprises lithium trifluoromethanesulfonate.

3. The cell of claim 1, wherein the electrolyte includes both lithium trifluoromethanesulfonate and lithium trifluoromethanesulphonylimide.

4. The cell of claim 1, wherein the active cathode material is manganese dioxide.

5. The cell of claim 1, wherein the aluminum couple includes two aluminum surfaces in electrical contact with each other.

6. The cell of claim 5, wherein the aluminum couple comprises a cathode current collector comprising aluminum and a positive lead comprising aluminum.

7. The cell of claim 1, wherein the electrolyte further comprises a material selected from the group consisting of ethylene carbonate, propylene carbonate, dimethoxyethane, and butylene carbonate.

8. The cell of claim 1, wherein the electrolyte further comprises dimethoxyethane.

9. The cell of claim 1, wherein the electrolyte further comprises ethylene carbonate.

10. The cell of claim 1, wherein the electrolyte further comprises butylene carbonate.

11. The cell of claim 1, wherein the electrolyte comprises dioxolane.

12. The cell of claim 1, wherein the aluminum couple comprises a cathode current collector comprising aluminum in electrical contact with a positive lead comprising a metal other than aluminum.

13. The cell of claim 1, wherein the active cathode material is iron disulfide.

14. The cell of claim 1, wherein the electrolyte comprises lithium salts consisting of (a), (b), and (c).

15. The cell of claim 14, wherein the lithium salts consist of $LiBF_4$, $LiPF_6$, and lithium trifluoromethanesulfonate.

16. The cell of claim 1, wherein the electrolyte does not include a perchlorate salt.

17. The cell of claim 1, wherein the electrolyte comprises from about 300 ppm to about 5,000 ppm of $LiBF_4$.

18. The cell of claim 1, wherein the electrolyte further comprises propylene carbonate.

19. The cell of claim 1, wherein the electrolyte includes at least 0.1 M of $LiPF_6$ by weight.

20. A method, comprising:
 discharging an electrochemical cell only once, the cell comprising
  a cathode comprising manganese oxide and/or iron disulfide,
  an anode comprising lithium,
  an aluminum couple; and
  an electrolyte, in contact with a surface of the aluminum couple, and comprising (a) from about 300 ppm to about 10,000 ppm $LiBF_4$ to reduce corrosion of the aluminum couple, (b) $LiPF_6$, and (c) a third lithium salt selected from the group consisting of lithium trifluoromethanesulfonate and lithium trifluoromethanesulphonvlimide; and
 disposing the cell without recharging the cell.

21. The method of claim 20, wherein the aluminum couple comprises a cathode current collector comprising aluminum in electrical contact with a positive lead comprising a metal other than aluminum.

22. The method of claim 20, wherein the aluminum couple comprises a cathode current collector comprising aluminum in electrical contact with a positive lead comprising aluminum.

23. The method of claim 20, wherein the electrolyte comprises lithium salts consisting of (a), (b), and (c).

24. The method of claim 20, wherein the electrolyte does not include a perchlorate salt.

25. The method of claim 20, wherein the electrolyte comprises a material selected from the group consisting of ethylene carbonate, propylene carbonate, dimethoxyethane, dioxolane, and butylene carbonate.

26. The method of claim 20, wherein the active cathode material is iron disulfide.

27. The cell of claim 20, wherein the electrolyte includes at least 0.1 M of $LiPF_6$ by weight.

28. A method of making a primary electrochemical cell in which the corrosion of an aluminum couple is suppressed, the method including
 adding a sufficient quantity of $LiBF_4$ to an electrolyte including $LiPF_6$ and a third lithium salt selected from the group consisting of lithium trifluoromethanesulfonate and lithium trifluoromethanesulphonylimide to shift corrosion potential of an aluminum electrode by at least 127 mV when tested by continuous cyclic voltammetry in an electrochemical glass cell having an aluminum working electrode, a lithium reference electrode, and two lithium auxiliary electrodes, the continuous cyclic voltammetry including cycles in which the potential initially is set to an open circuit potential, then anodically scanned to +4.5 V, and then reversed to an open circuit potential, the scan rate being 50 mV/sec, the corrosion potential being the potential at which anodic current density reached $10^{-4}$ A/cm$^2$ at a first cycle; and
 incorporating the electrolyte into an electrochemical cell comprising a cathode including an active cathode material selected from the group consisting of manganese dioxide and iron disulfide, the active cathode material including water, an anode comprising lithium, and an aluminum couple in contact with the electrolyte.

29. The method of claim 28, wherein the method also includes discharging the cell only once and disposing the cell without recharging the cell.

30. The method of claim 28, wherein the aluminum couple includes cathode current collector comprising aluminum is in electrical contact with a positive lead comprising a metal other than aluminum.

31. The method of claim 30, wherein the metal is stainless steel.

32. The method of claim 28, wherein the aluminum couple comprising a cathode current collector comprising aluminum in electrical contact with a positive lead comprising aluminum.

33. The method of claim 28, wherein the active cathode material is iron disulfide.

34. The method of claim 28, wherein the active cathode material is manganese dioxide.

35. The method of claim 28, wherein the electrolyte comprises lithium salts consisting of $LiBF_4$, $LiPF_6$, and lithium trifluoromethanesulphonylimide and/or lithium trifluoromethanesulfonate.

36. The method of claim 35, wherein the lithium salts consist of $LiBF_4$, $LiPF_6$, and lithium trifluoromethanesulphonylimide.

37. The method of claim 35, wherein the lithium salts consist of $LiBF_4$, $LiPF_6$, and lithium trifluoromethanesulfonate.

38. The method of claim 28, wherein the electrolyte does not include a perchlorate salt.

39. The method of claim 28, wherein the electrolyte comprises from about 300 ppm to about 5,000 ppm of the $LiBF_4$.

40. The method of claim 28, wherein the electrolyte comprises a material selected from the group consisting of ethylene carbonate, propylene carbonate, dimethoxyethane, and butylene carbonate.

41. The method of claim 28, wherein the electrolyte comprises dioxolane.

42. The cell of claim 28, wherein the electrolyte includes at least 0.1 M of $LiPF_6$ by weight.

* * * * *

UNITED STATES PATENT AND TRADEMARK OFFICE
CERTIFICATE OF CORRECTION

| | |
|---|---|
| PATENT NO. | : 7,479,348 B2 |
| APPLICATION NO. | : 11/101890 |
| DATED | : January 20, 2009 |
| INVENTOR(S) | : Nikolai N. Issaev and Michael Pozin |

Page 1 of 1

It is certified that error appears in the above-identified patent and that said Letters Patent is hereby corrected as shown below:

In Claim 20, line 32, delete "trifluoromethanesulphonvlimide;" and insert --trifluoromethanesulphonylimide--.

Signed and Sealed this

Seventeenth Day of March, 2009

JOHN DOLL
*Acting Director of the United States Patent and Trademark Office*